United States Patent [19]

Satoh et al.

[11] Patent Number: 5,105,667
[45] Date of Patent: Apr. 21, 1992

[54] STRAIN MEASURING DEVICE EMPLOYING MAGNETOSTRICTION AND HAVING A MAGNETIC SHIELDING LAYER

[75] Inventors: Hiroshi Satoh; Yoshihiko Utsui, both of Hyogo, Japan

[73] Assignee: Mitsubishi Denki Kabushiki Kaisha, Tokyo, Japan

[21] Appl. No.: 686,380

[22] Filed: Apr. 17, 1991

Related U.S. Application Data

[62] Division of Ser. No. 336,812, Apr. 19, 1989, Pat. No. 5,022,275.

Foreign Application Priority Data

Jun. 15, 1988 [JP] Japan ................... 63-147281
Jun. 29, 1988 [JP] Japan ................... 63-162807

[51] Int. Cl.$^5$ .................... G01L 3/10; G01B 7/24
[52] U.S. Cl. .................... 73/862.36; 73/779; 324/209; 505/842; 505/872
[58] Field of Search ........... 73/862.36, 779, DIG. 2; 324/209; 505/701, 842, 872

[56] References Cited

U.S. PATENT DOCUMENTS 3,861,206  1/1975  Kawafune et al. ......... 73/862.36 X
4,805,466  2/1989  Schiessle et al. ............ 73/862.36

FOREIGN PATENT DOCUMENTS

0042628  3/1985  Japan ................... 73/862.36
0079239  5/1985  Japan ................... 73/862.36

Primary Examiner—Charles A. Ruehl
Attorney, Agent, or Firm—Rothwell, Figg, Ernst & Kurz

[57] ABSTRACT

In a strain measuring device employing a magnetic permeability detector means to detect an amount of strain in a passive member as changes of magnetic permeability in a magnetostrictive layer, a magnetic shielding layer is formed on the surface of the passive member, and the magnetostrictive layer is formed thereon so as to lessen the adverse effects of the passive member caused by the magnetic characteristics of the passive member in strain measurement, that is, to reduce measurement errors. Alternatively, a magnetostrictive layer is formed on the surface of the passive member, or a magnetic shielding layer is partially formed on the surface of the passive member of a soft magnetic material with high permeability, so as to lessen the influence of the passive member caused by thermal stresses of the passive member in strain measurement, that is, to reduce measurement errors. Further, there is provided a strain measuring device which facilitates formation of the magnetostrictive layer.

26 Claims, 5 Drawing Sheets

STRAIN MEASURING DEVICE EMPLOYING MAGNETOSTRICTION AND HAVING A MAGNETIC SHIELDING LAYER

This application is a division of Ser. No. 07/336,812 filed Apr. 12, 1989, now U.S. Pat. No. 5,022,275, issued Jun. 11, 1991.

BACKGROUND OF THE INVENTION

This invention relates to a strain measuring device for determining a magnitude of torque applied to a passive member and an amount of strain caused by the torque applied.

DESCRIPTION OF THE PRIOR ART

Generally, when an external force is applied to a passive member of magnetic material, it is deformed by the external force and its magnetic permeability is varied according to the amount of strain on the material. Therefore, the amount of strain can be determined by detecting changes in the magnetic permeability of the passive member which is subjected to magnetic fluxes.

Figure 1:
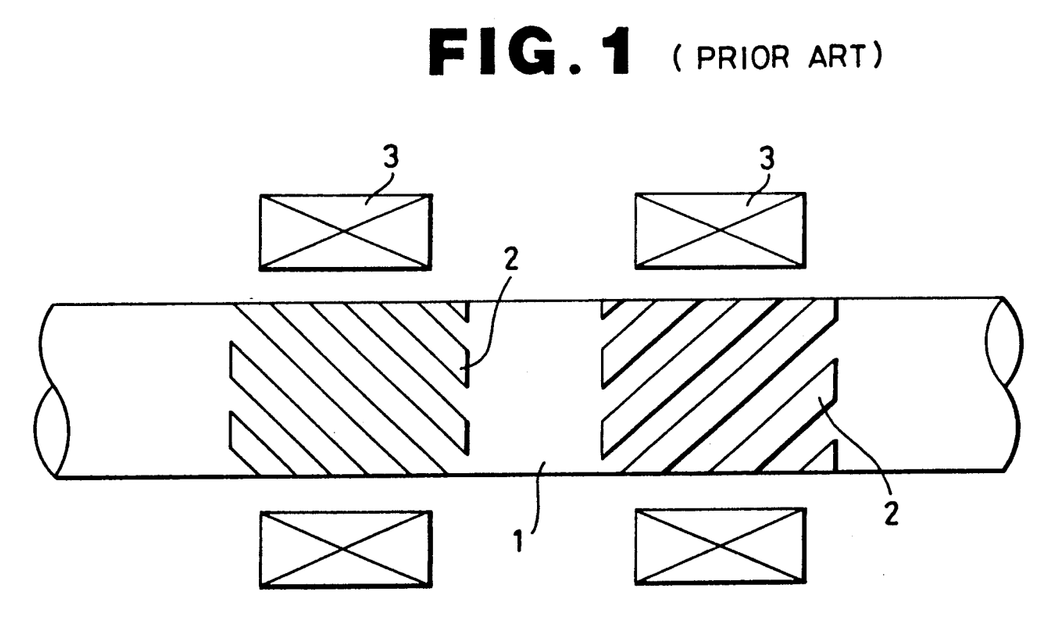
FIG. 1 is a schematic fragmentary illustration showing partial constitution of a conventional strain measuring device.

Illustrated in FIG. 1 is a conventional strain measuring device as disclosed in Japanese Patent Laid-Open Publication No. 57-211030. In FIG. 1, reference numeral 1 denotes a cylindrical passive member which receives a torque applied by an external force, 2 denotes a pair of band-like magnetostrictive layers fixed on the passive member 1 so as to change their magnetic permeability according to the amount of internal strain resulting from the torque applied, and 3 denotes a pair of detector coils disposed around the magnetostrictive layers 2 so as to detect the changes of the magnetic permeability thereof. The respective magnetostrictive layers are constituted by a plural number of band-like or short strip-like elements disposed symmetrically at angles of ±45° to the axis of the passive member 1.

In operation, when an external torque is applied to the passive member 1, principal stresses each having a principal axis in the direction of the longitudinal axis of the respective magnetostrictive layers 2 occurs. These principal stresses are, for example, a tensile force for one group of elements of magnetostrictive layers 2 and a compressive force for the other group of elements of magnetostrictive layers 2. Generally, mechanical stresses cause a magnetic material with a magnetostriction constant of other than zero to change magnetic properties so that changes in its magnetic permeability occur as mentioned above. This phenomenon to convert mechanical energy into electric energy is utilized in a so-called magnetostrictive transducer and is caused by the Villari effect that magnetic permeability of magnetic material changes due to mechanical deformation thereof. It is also known that, in case of a magnetostriction constant, which quantitatively expresses a rate of magnetostriction, being positive, the magnetic permeability is increased where tensile force is applied and reduced where compressive force is applied. Inverse results are obtained in case of a negative constant. Accordingly, mechanical deformation due to a torque externally applied can be detected as changes in magnetic permeability of the magnetostrictive layer 2, and the permeability changes can be detected as changes in magnetic impedance by means of the detector coils 3, so that the torque applied to the passive member 1 and accompanying strain can be measured.

In the conventional strain measuring device as described above, the magnetic fluxes generated by energizing the detector coils 3 pass through the magnetostrictive layers 2, so that the changes in permeability resulting from the strain in the magnetostrictive layer 2 can be detected as changes in output of the detector coil 3. However, since such magnetic fluxes also permeate into the passive member 1 under the magnetostrictive layers 2, which member is generally formed out of ferromagnetic steel material such as SS41, SPCC or the like, there has been a problem that errors in measurement occur due to irregularities in magnetic characteristics and singular changes caused by magnetization of the passive member 1.

Besides, there has been another problem that accurate measurement of strain is often hindered by the thermal stresses due to a large difference in linear expansion coefficient between the passive member 1 and the magnetostrictive layers 2 fixedly secured on the surface of the passive member 1 which thermal stresses are superimposed upon the stresses resulting from the strain to be measured.

There has been still another problem that the magnetostrictive layers 2 of short strip-like forms are relatively hard and not easy to shape by machining.

SUMMARY OF THE INVENTION

The present invention contemplates solving the above-described problems of the conventional devices, and has as its object the provision of a strain measuring method and a device with high reliability and accuracy which can preclude the errors in measurement caused by a passive member itself and which is free from temperature dependency.

It is another object of the invention to provide a strain measuring method and a device which facilitate formation of substantial magnetostrictive layers.

The strain measuring device according to the present invention is provided with a magnetic shielding layer of metal with good conductivity or of superconductive material between the passive member and the magnetostrictive layers to shield them magnetically from each other. This magnetic shielding layer serves to prevent magnetic fluxes from penetrating into the passive member under the magnetostrictive layer by the skin effect or Meissner effect.

The strain measuring device according to the invention is provided with a passive member of soft magnetic material with high magnetic permeability or a magnetostrictive layer of soft magnetic material with high magnetic permeability formed on the surface of the passive member, a magnetic shielding layer formed partially on the surface of the magnetostrictive layer of paramagnetic or diamagnetic material with high conductivity, and a magnetic drive source for passing magnetic fluxes through only portions of the magnetostrictive layer not covered with the magnetic shielding layers. In another aspect of the invention, a substantial magnetostrictive layer comprises a magnetostrictive layer and magnetic shielding layers of superconductive material formed partially on the magnetostrictive layer.

This arrangement is free from the problem of difference in linear expansion coefficient because the magnetostrictive layer is formed as a part of the passive member.

Besides, the superconductive material provides magnetic shielding means by Meissner effect.

DETAILED DESCRIPTION OF THE PREFERRED EMBODIMENTS

Figure 2:
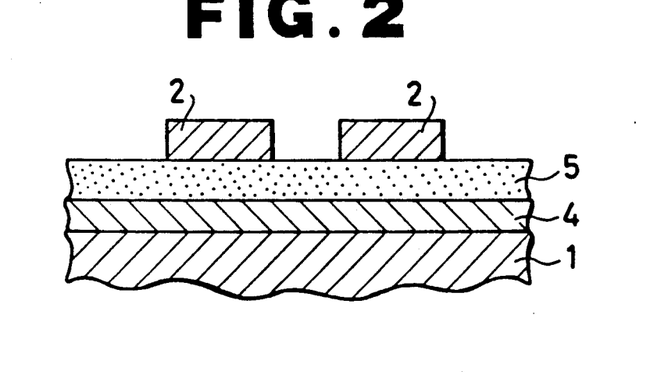
FIG. 2 is a fragmentary sectional view of a strain measuring device in the first embodiment of the invention.

Hereafter, the invention is described more particularly by way of preferred embodiments shown in the drawings. Referring to FIG. 2, there is shown a strain measuring device which has a magnetic shielding layer 4 of metal with high conductivity such as Cu, Al, Ag, Au or the like formed on the surface of a passive member 1 by plating, and magnetostrictive layers 2 of amorphous magnetic material or permalloy adhered to the surface of the magnetic shielding layer 4 through an adhesive layer 5. Detector coils 3 (not shown) are disposed around the respective magnetostrictive layers 2. The magnetic shielding layer 4 shields magnetic flux from the detector coils 3, and the magnetostrictive layers 2 are formed in short strip shapes as shown in FIG. 1.

In operation, high frequency current is fed to the detector coils 3 to generate high frequency magnetic fluxes. Considering the magnetic flux density at a conductor surface, it attenuates according to $$e^{-\sqrt{\frac{\omega\sigma\mu}{2}}\,z}$$

where $\omega$ is an angular frequency of the magnetic flux $\sigma$ is conductivity of the conductor and $\mu$ is magnetic permeability of the conductor. Accordingly, the skin depth $\delta$ of the magnetic flux is expressed by:

$$\delta = \sqrt{\frac{2}{\omega\sigma\mu}}$$

Figure 3:
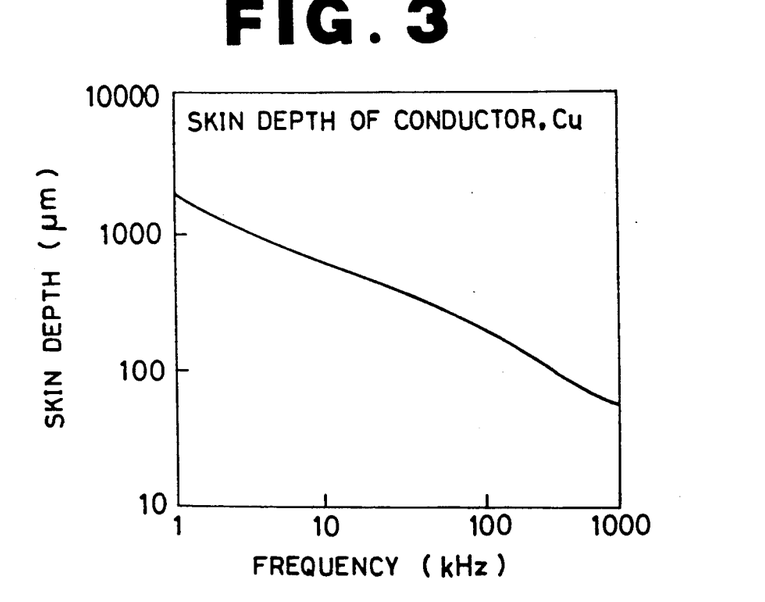
FIG. 3 is a characteristics diagram showing the skin depth of the conductor, Cu.

The value of $\delta$ becomes small since both $\sigma$ and $\omega$ of the magnetic shielding layer 4 are large. In the case of Cu, approximately $\delta = 250$ μm at $\omega = 50$ kHz as shown in FIG. 3. Therefore, if the magnetic shielding layer 4 has a thickness of about 200 μm, the magnetic fluxes cannot reach to the passive member 1, so that the magnetostrictive layers 2 and the passive member 1 are magnetically separated and insulated from each other. It follows that the errors in measurement due to irregularities in magnetic characteristics or singular changes of the passive member 1 can be precluded.

Figure 4:
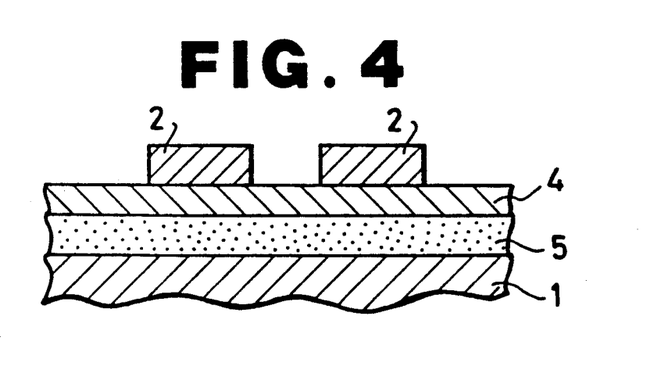
FIGS. 4 to 6 are fragmentary sectional views of strain measuring devices in the second to fourth embodiments of the invention, respectively.

Referring to FIG. 4, there is illustrated a strain measuring device according to the second embodiment of the invention, in which magnetostrictive layers 2 are attached to a magnetic shielding layer 4 by plating before fixing the latter to a passive member 1 through an adhesive layer 5. In addition to the effects similar to those of the above-described first embodiment, the strain measuring device of this embodiment improves reliability all the more, because of ensuring the strength of adhesion of the chemically instable magnetostrictive layers 2 by fixing it to the passive member 1 through the chemically stable magnetic shielding layer 4.

Figure 5:
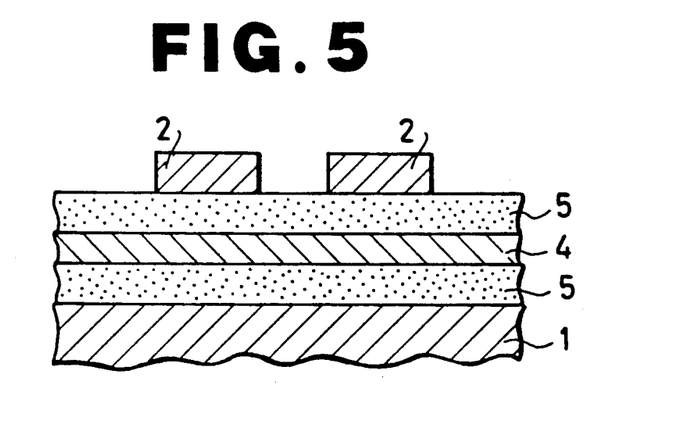

Illustrated in FIG. 5 is a strain measuring device in the third embodiment of the invention, in which a magnetic shielding layer 4 is adhered to a passive member 1 through an adhesive layer 5, and magnetostrictive layers 2 are fixed to the magnetic shielding layer 4 through another adhesive layer 5. This arrangement have effects similar to those of the device of the first embodiment.

Figure 6:
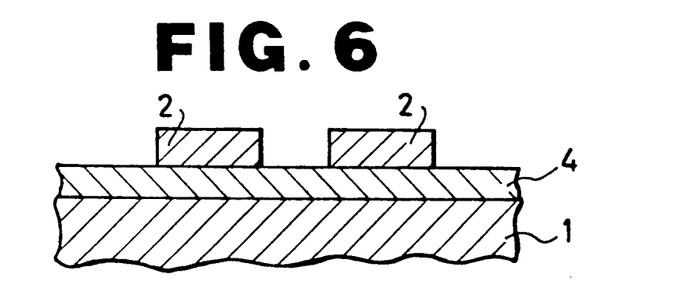

FIG. 6 shows a strain measuring device in the fourth embodiment of the invention, in which a magnetic shielding layer 4 is directly attached to a passive member 1 and magnetostrictive layers 2 and which has the same effects as in the first embodiment.

Although in the foregoing embodiments the magnetic shielding layer 4 is attached directly to the passive member and/or the magnetostrictive layers 2 mainly by plating, one may resort to vapor deposition or ion plating for this purpose. Further, it is possible to employ a non-magnetic joining member instead of the adhesive layer 5. Moreover, the magnetic shielding layer 4 which has been described as being of a metal with high conductivity may be formed out of superconductive metal if desired. In this case, the skin depth of the magnetic flux as a magnetic insulator becomes $\delta = 0$ due to the Meissner effect of the superconductive metal.

Figure 7:
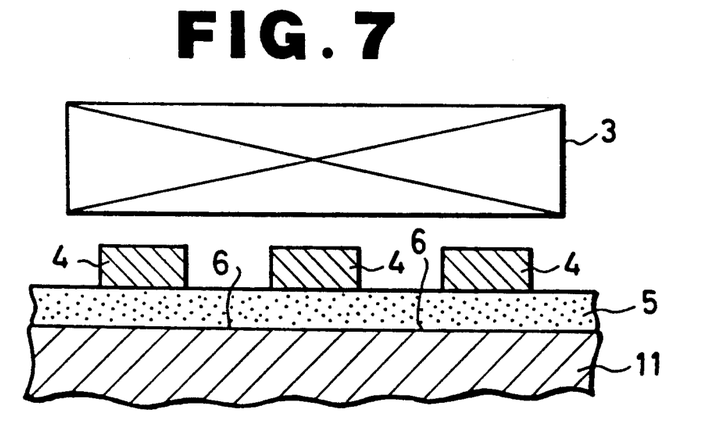
FIGS. 7 to 12 are fragmentary sectional views of strain measuring devices in the fifth to tenth embodiments of the invention, respectively.

Illustrated in FIG. 7 is a strain measuring device in the fifth embodiment of the invention. In FIG. 7, reference numeral 11 denotes a passive member formed out of soft magnetic material with high permeability such as 50%N-i permalloy rod or the like, and 4 denotes a magnetic shielding layer adhered to the circumference of the passive member 11 through an adhesive layer 5 of an adhesive or solder. The magnetic shielding layer 4 consists of paramagnetic or diamagnetic material with high conductivity, for example, Au, Al, Cu, Ag, Pt or the like, and is formed in short strip shape as shown in FIG. 1 (i.e. the layer 4 is formed instead of the layer 2 in FIG. 1). Detector coil 3 is disposed around the circumference of the magnetic shielding layer 4.

In operation, a plural number of short strip-like portions 6 (connected annularly at opposite ends), which are formed by portions of the passive member 11 between the strip-like magnetic shielding layers 4 provided on the circumference of the shaft-like passive member 11, serve as magnetostrictive layers similar to the magnetostrictive layers 2 of FIG. 1. The magnetostrictive short strip-like portions 6 are thus in substantially the same configuration as the magnetostrictive layers 2 of FIG. 1. As described hereinbefore, high frequency magnetic fluxes are generated by applying a high frequency current to the coil 3.

In case of Cu, the skin depth of the magnetic flux is about $\sigma = 250$ μm at 50 kHz as shown in FIG. 3. Therefore, by forming the magnetic shielding layer of greater than $\sigma$ in thickness, the magnetic fluxes are blocked where the magnetic shielding layer 4 exists, and are applied to only the strip like portions 6 on the passive member 11. When an external force, e.g., a torque is applied to the passive member 11, the latter is strained and its magnetic impedance relative to the magnetic flux. Therefore, there appear corresponding changes in outputs of the detector coils 3, so that the amount of strain can be measured on the basis of the changes in the differential output of the coils. In this particular embodiment, since the magnetostrictive layers are formed by those portions in the passive member which are not covered with the magnetic shielding layer 4, it is possible to measure the strain with high accuracy free of the problem of thermal stresses in contrast with the conventional devices. Further, since the magnetic shielding layer 4 is formed out of paramagnetic or diamagnetic material, there is no possibility of errors in measurement resulting from irregularities in magnetic properties or from magnetization. Because the shape of the magnetostrictive layers is determined by that of the magnetic shielding layer 4, which can be formed easily, the magnetostrictive layers can be formed into any arbitrary forms with ease.

Figure 8:
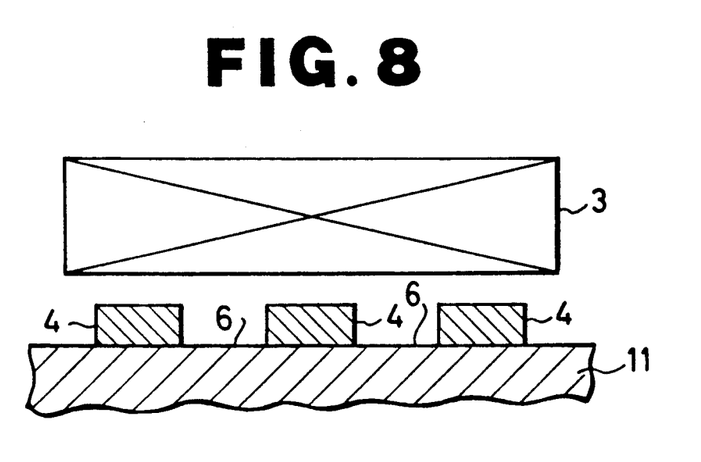

Referring to FIG. 8, there is shown a strain measuring device in the sixth embodiment of the invention, which is simplified in construction by directly fixing a magnetic shielding layer 4 of a paramagnetic or diamagnetic metal with high conductivity to a passive member of soft magnetic material with high permeability like permalloy by vapor deposition, plating, ion-plating or the like.

Figure 9:
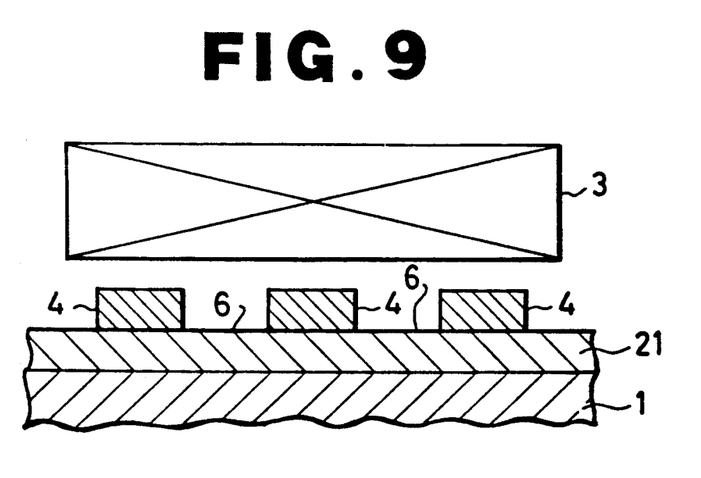

Illustrated in FIG. 9 is a strain measuring device in the seventh embodiment of the invention, in which a magnetostrictive layer 21 of soft magnetic material with high permeability like permalloy is formed around the circumference of a passive member 1 of the conventional type, and magnetic shielding layers 4 of the paramagnetic or diamagnetic material with high conductivity are formed on the surface of the magnetostrictive layer 21 by vapor deposition or the like. It is also easy to form a substantial magnetostrictive layer in this embodiment, while precluding the magnetic adverse effects of the magnetic shielding layer 4. In this case, the passive member 1 can be constructed at low cost because there is no need for using expensive magnetostrictive material therefor.

Figure 10:
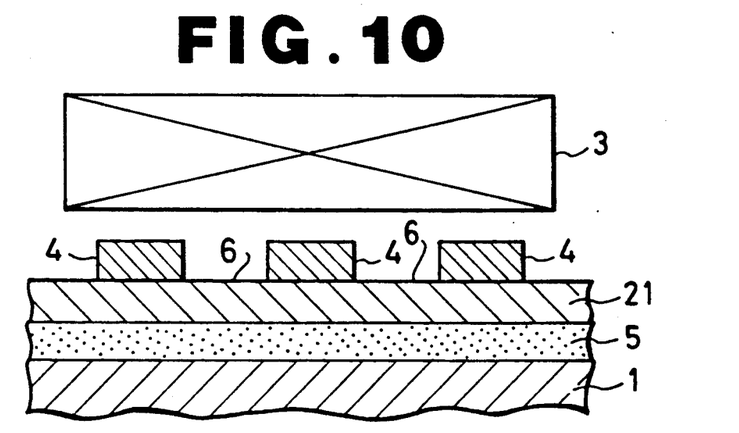
Figure 11:
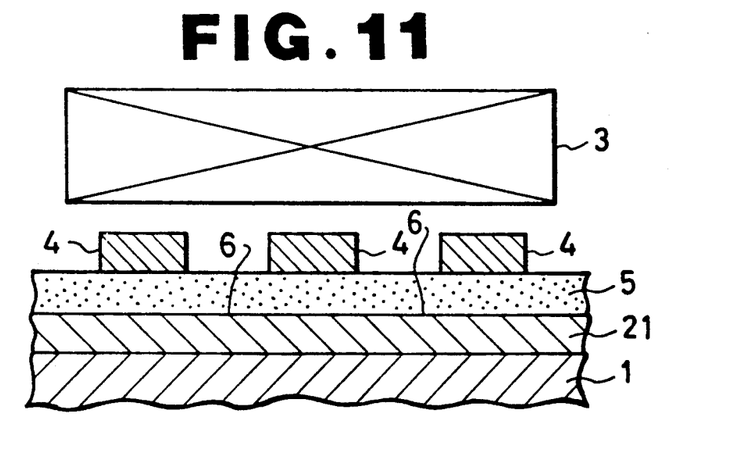
Figure 12:
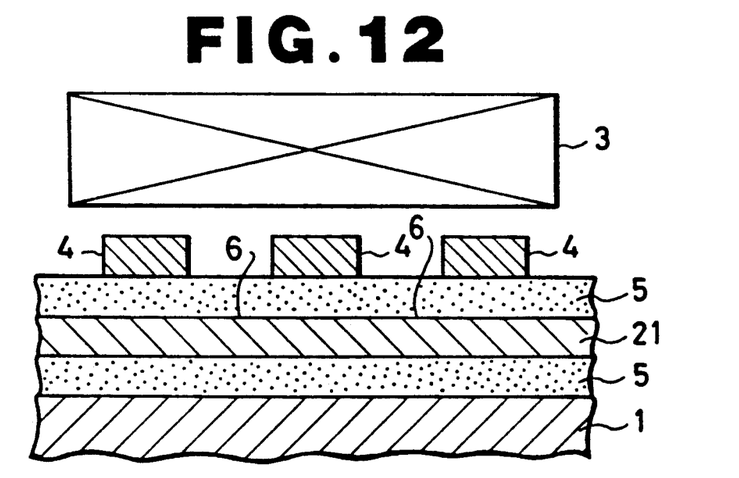

FIGS. 10 to 12 show strain measuring devices in the eighth to tenth embodiments of the invention, which are different from the seventh embodiment of FIG. 9 in that an adhesive layer 5 is provided between the passive member 1 and magnetostrictive layer 21 and/or between the magnetostrictive layer 21 and magnetic shielding layers 4, but has substantially the same performance as that of the embodiment in FIG. 7.

In the eleventh embodiment of the invention, the magnetic shielding layers 4 of strain measuring device of FIG. 7 or FIGS. 8 to 12 is formed out of high temperature superconductive material of Nb-Ni system, $Nb_3Sn$ system, Ba-Y-Cu-O system, Sc-Sr-CuO system, La-Ba-Cu-O system or the like. Superconductive material exhibits perfect diamagnetism, i.e., magnetic shielding by the Meissner effect. Accordingly, the skin depth $\sigma = 0$, and the magnetic shielding layer 4 suffices to be in the form of an extremely thin film, so that it can be reduced in size and cost. Other effects are the same as described hereinbefore in connection with the foregoing embodiments. The magnetic shielding layer 4 of superconductive material may be attached by way of an adhesive layer or directly by vapor deposition, plating, ion plating or sputtering.

What is claimed is:

1. A strain measuring device, comprising:
    a passive member for receiving an external force;
    a magnetic shielding layer covering the surface of said passive member for magnetically shielding said passive member from magnetic influences;
    a magnetostrictive layer on the surface of said magnetic shielding layer, having short strip-like elements of soft magnetic material with high magnetic permeability which varies as a function of said external force; and
    a permeability detection means located around said magnetostrictive layer for subjecting said magnetostrictive layer to magnetic flux and for detecting changes of magnetic permeability in the magnetostrictive layer caused by strain produced by said external force.

2. A strain measuring device as defined in claim 1, wherein said passive member is of ferromagnetic material of cylindrical shape with circular cross section.

3. A strain measuring device as defined in claim 2, wherein said permeability detection means is a coil for generating magnetic fluxes on energization.

4. A strain measuring device as defined in claim 3, wherein said magnetic shielding layer is of metal with high conductivity.

5. A strain measuring device as defined in claim 3, wherein said magnetic shielding layer is formed out of superconductive material.

6. A strain measuring device as defined in claim 5, wherein said superconductive material is of high-temperature superconductivity.

7. A strain measuring device as defined in claim 1, wherein said magnetic shielding layer is formed on said passive member by plating, and fixed to said magnetostrictive layer through an adhesive layer.

8. A strain measuring device as defined in claim 1, wherein said magnetostrictive layer is formed on said magnetic shielding layer by plating, vapor deposition, ion-plating or sputtering, and said magnetic shielding layer is fixed to said passive member through an adhesive layer.

9. A strain measuring device as defined in claim 1, wherein said magnetic shielding layer is fixed to said passive member through a first adhesive layer and to said magnetostrictive layer through a second adhesive layer.

10. A strain measuring device as defined in claim 1, wherein said magnetic shielding layer is directly formed on said passive member by plating, vapor deposition, ion-plating or sputtering, and said magnetostrictive layer is directly formed on said magnetic shielding layer by plating, vapor deposition, ion-plating or sputtering.

11. A strain measuring device comprising:
    a passive member for receiving an external force;
    a magnetostrictive layer covering the surface of said passive member and having a high magnetic permeability which is variable as a function of the external force;
    a magnetic shielding layer covering partially the surface of said magnetostrictive layer for shielding the covered portions of the surface of said magnetostrictive layer from magnetic influences, whereas those portions of said magnetostrictive layer which are not covered remain exposed to magnetic influences; and
    a permeability detection means positioned around said magnetostrictive layer for subjecting those portions of the surface of said magnetostrictive layer not covered by said magnetic shielding layer to magnetic flux and for detecting changes of magnetic permeability in those portions of said magnetostrictive layer not covered with said magnetic shielding layer, caused by strain produced by the external force.

12. A strain measuring device as defined in claim 11 wherein said passive member is of ferromagnetic material of cylindrical shape with circular cross section.

13. A strain measuring device as defined in claim 12, wherein said permeability detection means is a coil for generating magnetic fluxes on energization.

14. A strain measuring device as defined in claim 13, wherein said magnetic shielding layer is superconductive material.

15. A strain measuring device as defined in claim 14, wherein said superconductive material is of high-temperature superconductivity.

16. A strain measuring device as defined in claim 15, wherein said high-temperature superconductive material is fixed to said passive member in rectangular strip shape.

17. A strain measuring device as defined in claim 15, wherein said high-temperature superconductive material is fixed to said passive member at an angle of 45° to the axis thereof in rectangular strip shape.

18. A strain measuring device as defined in claim 13, wherein said magnetic shielding layer is of paramagnetic material with high conductivity.

19. A strain measuring device as defined in claim 18, wherein said high-conductive material is fixed to said passive member in rectangular strip shape.

20. A strain measuring device as defined in claim 18, wherein said high-conductive material is fixed to said passive member at an angle of 45° to the axis thereof in rectangular strip shape.

21. A strain measuring device as defined in claim 13, wherein said magnetic shielding layer is of diamagnetic material with high conductivity.

22. A strain measuring device as defined in claim 21, wherein said high-conductive material is fixed to said passive member in rectangular strip shape.

23. A strain measuring device as defined in claim 21, wherein said high-conductive material is fixed to said passive member at an angle of 45° to the axis thereof in rectangular strip shape.

24. A strain measuring device as defined in claim 11, wherein said magnetic shielding layer is directly formed on said magnetostrictive layer by plating, vapor deposition, ion-plating or sputtering.

25. A strain measuring device as defined in claim 11, wherein said magnetostrictive layer is fixed to said passive member through an adhesive layer.

26. A strain measuring device as defined in claim 11, wherein said magnetostrictive layer is fixed to said passive member through a first adhesive layer and to said magnetic shielding layer through a second adhesive layer.

* * * * *

UNITED STATES PATENT AND TRADEMARK OFFICE
CERTIFICATE OF CORRECTION

PATENT NO. : 5,105,667
DATED : April 21, 1992
INVENTOR(S) : Hiroshi Satoh, et al.

It is certified that error appears in the above-identified patent and that said Letters Patent is hereby corrected as shown below:

On the title page:
In the Abstract, line 22, delete --a--.

Column 4, line 34 change "N-i" to --Ni--.

Signed and Sealed this

Twenty-third Day of November, 1993

Attest:

BRUCE LEHMAN

*Attesting Officer*     *Commissioner of Patents and Trademarks*